United States Patent [19]

Hori et al.

[11] Patent Number: 4,613,965
[45] Date of Patent: Sep. 23, 1986

[54] DIGITAL AUDIO DISC SYSTEM

[75] Inventors: Katsuya Hori; Tsuneo Furuya, both of Tokyo, Japan

[73] Assignee: Sony Corporation, Tokyo, Japan

[21] Appl. No.: 722,434

[22] Filed: Apr. 15, 1985

Related U.S. Application Data

[63] Continuation of Ser. No. 460,595, Jan. 24, 1983, abandoned.

[30] Foreign Application Priority Data

Feb. 2, 1982 [JP] Japan .................................. 57-15125

[51] Int. Cl.$^4$ ............................................. G11B 31/00
[52] U.S. Cl. ....................................... 369/59; 369/32; 369/70
[58] Field of Search .................. 358/342, 335; 360/32, 360/27, 72.1, 72.2, 19.1, 10.1–10.3; 369/30, 32, 33, 59, 111, 69, 70, 124

[56] References Cited

U.S. PATENT DOCUMENTS

| | | | |
|---|---|---|---|
| 4,237,497 | 12/1980 | Trevithick | 360/72.1 |
| 4,305,131 | 12/1981 | Best | 358/342 |
| 4,321,635 | 3/1982 | Tsuyuguchi | 369/32 |

Primary Examiner—Donald McElheny, Jr.

Attorney, Agent, or Firm—Lewis H. Eslinger; Alvin Sinderbrand

[57] ABSTRACT

A digital audio disc system having a main channel in which main data consisting of audio PCM signals and codes for error correction are recorded and a subchannel in which information digital signals other than said main data are recorded is disclosed. The code signals comprising a sync signal which has a prescribed bit pattern, a display position data, a command for a computer, and a display data relating a content of said audio PCM signals are also recorded multi-times on the disc together with said main data so as to enable the error check of said code signals. Both code signals and main data are reproduced and supplied to a display unit so as to indicate the correct display information data on a display screen under control of a microcomputer provided in the playback side. When a pickup device moves on the disc in the radial direction at a speed higher than that in an ordinary playback operation, the display screen of said display unit is cleared or previously reproduced normal display data is held on the screen. When the pickup device does not start the playback of said display data from the display start position, the display data thus reproduced is made invalid until the display data at the display start position is reproduced. In this way, it is possible to prevent indication of abnormal display data.

13 Claims, 7 Drawing Figures

DIGITAL AUDIO DISC SYSTEM

This is a continuation of application Ser. No. 06/460,595, filed Jan. 24, 1983, now abandoned.

BACKGROUND OF THE INVENTION

The present invention relates to a digital audio disc system in which an audio PCM signal is recorded as a geometrical pattern.

Conventionally, audio discs contain analog audio information recorded therein in the form of various undulation in a spiral groove. Such undulations are sensed by a stylus of a playback device, the stylus riding in the spiral groove and following the various undulations therein. Typically, the stylus is coupled to a magnetic sensor, or cartridge, whereby the mechanical motion of the stylus is converted to an electrical signal; and this electrical signal ultimately is converted into audible sound.

Recently, it has been proposed to digitize audio information, and to record the digital audio signals directly on a disc. The digital signals are sensed, or played back, by optical means such as a scanning laser beam. The produced digital signals then are re-converted back to audio signals which are used to generate corresponding sounds. Many advantages arise from the digital recording of audio information, such as markedly improved fidelity of the original audio signals, the ability to produce high-density digital audio discs which contain a larger quantity of information and thus permit relatively long playback times, and, since the playback "head" need not be in physical contact with the disc, the disc will be subjected to virtually no wear, and selected portions, or programs may be rapidly accessed for reproduction.

In digitizing the audio information to be recorded on the digital audio disc, it is pulse code modulated (PCM). To assure proper and desirable playback of such audio PCM signals, various synchronizing and control signals along with error correction code are also recorded on the disc, and such signals advantageously are multiplexed with the digital audio signals. The use of digital techniques enables at least some of the control signals to function as cue signals for use in controlling the playback device, editing equipment or the like. For example, the cue signals may represent the identity of the audio information program which is recorded, the length of that program, the number of programs recorded on a disc, the location of the beginning or end of that program, the composer, author or performers of that program, various movements of that program (particularly where such programs are musical performances), and the like.

As described above, a digital audio disc may have a main channel in which the main data consisting of audio PCM signals and a code for error correction are recorded and a subchannel in which various information digital signals other than the main data are recorded. In such a digital audio disc system, it is desirable to display such various information data on a display device so as to make known the various necessary information and to enable the simpler, easier and quick playback operation.

However, in a conventional digital audio disc system, there were many defects, such as, the display data lacks a part thereof; the display data is not displayed in the correct position; different contents are displayed on the screen simultaneously; the display data is displayed in fragments, and so on.

The indication of such abnormal display data mentioned above often occurs when the pickup device moves at a high speed in the radial direction on the disc in the search mode, or when the power of the system is turned on, or when the playback is not started precisely from the display start position, and the like.

There is also a defect that an extra display control unit must be prepared to prevent the indication of the abnormal display data, this causes a larger hardware for correct display data on the display device.

SUMMARY OF THE INVENTION

It is therefore an object of the present invention to provide a digital audio disc system which enables the easy error check of the display data reproduced, thereby eliminating the indication of the abnormal display data on the display device.

It is another object of the invention to provide a digital audio disc system in which the display control is performed by a microcomputer on the playback side, thereby reducing the hardware needed for that purpose.

It is a further object of the invention to provide a digital audio disc system which can prevent the indication of abnormal display data in the search mode, namely in the case where the pickup device moves on the disc at a higher speed in the radial direction than during the ordinary playback mode.

It is still another object of the invention to provide a digital audio disc system which enables the correct display of the display data on the display device even when the power is turned on or even when the playback operation is started at any portion of the tracks on the disc.

Briefly described, these and other objects of the invention are accomplished by the provision of a digital audio disc system having a main channel in which main data consisting of audio PCM signals and codes for error correction are recorded and a subchannel in which information digital signals other than said main data are recorded, wherein code signals comprising a sync signal which has a prescribed bit pattern, a display position data, a command for a computer, and a display data relating to a content of said audio PCM signals being recorded two times or more on the disc together with said main data so as to enable the error check of said code signals by using said sync signal and said code signals thus recorded multi-times.

According to the present invention there is also provided a digital audio system having a main channel in which main data consisting of audio PCM signals and codes for error correction are recorded and a subchannel in which information digital signals other than said main data are recorded, wherein code signals including display data relating to a content of said audio PCM signals together with said main data being reproduced and said display data in said signals thus reproduced being supplied to a display unit, and wherein, when a pickup device moves on the disc in the radial direction at a speed higher than that in an ordinary playback operation, a display screen of said display unit being cleared or a previous normal display data being held, and wherein, when said pickup device does not start the playback of said display data from the display start position, the display data thus reproduced being made invalid until the display data at said display start position is reproduced.

BRIEF DESCRIPTION OF THE DRAWINGS

The objects, features and advantages of the digital audio disc system according to the present invention will be more apparent from the following description of a preferred embodiment, taken in conjunction with the accompanying drawings, in which.

DETAILED DESCRIPTION OF THE PREFERRED EMBODIMENT

Figure 1A:
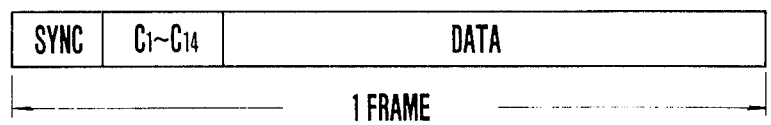
FIGS. 1A and 1B are schematic diagrams for describing data constructions in an embodiment of the present invention.

Referring now to FIG. 1A, there is schematically illustrated the format of a "frame" of signals which are recorded in, for example, one track of a digital audio PCM disc (referred to as a compact disc hereinafter). The frame of signals includes data information, such as audio PCM signals and codes for error correction, which are preceded by a synchronizing signal, or frame sync, disposed at the beginning or "head" of the frame, followed by subcoding signals (generally known as user's bits) which, in one example, are represented as 14-bit signals $C_1$–$C_{14}$.

Such a compact disc is produced in the same manner as a conventional analog disc, namely, a great number of compact discs are subsequently reproduced from a so-called master record disc by way of the stamp process by supplying the reproduction data of a master tape to an optically cutting machine.

In the embodiment described herein, the 14-bit signal is formed by multiplexing individual bits of respective data channels. More particularly, eight channels may be provided, and the 14-bit signal is formed by selecting one bit from each of these eight channels, and then converting the resultant 8-bit signal to a 14-bit signal. That is, the original data is recorded on the disc by performing the channel coding processing to convert the 8-bit data into the 14-bit data. Those of ordinary skill in the art will recognize that such an 8/14 bit conversion is helpful in improving noise immunity of the digital signal.

Figure 1B:
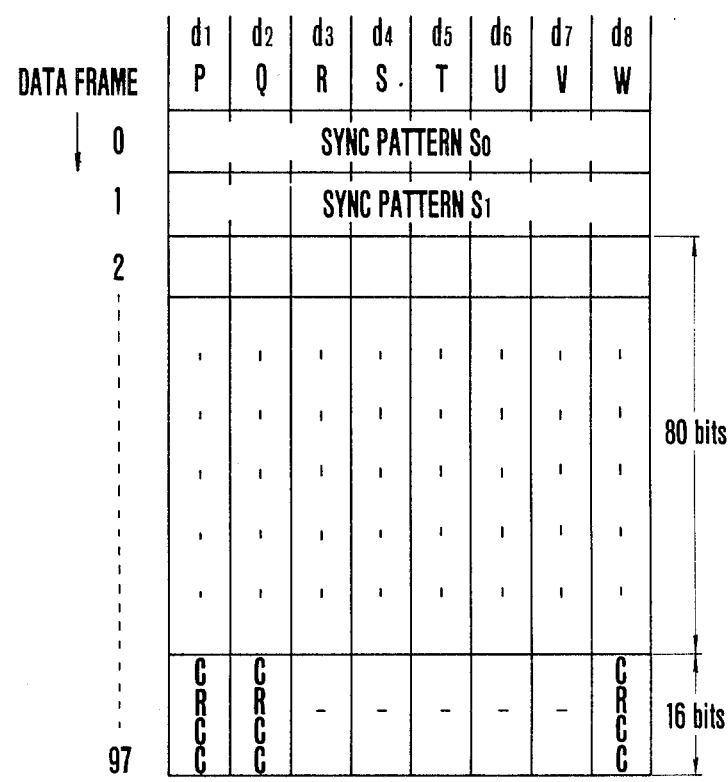

FIG. 1 represents ninety-eight successive data frames, each frame having the format illustrated in FIG. 1A. It is seen that the afore-described subcoding signals $C_1$–$C_{14}$ correspond to the 8-bit data $d_1$–$d_8$. These eight channels are represented as channels P, Q, R . . . W. These subcoding signals include the control and display information. Each subcoding signal has individual information, and each one bit thereof is interposed in each frame of the data. These subcoding signal bits of each channel which are included in the ninety-eight (0–97) frames are successive data as shown in FIG. 1B.

In the format illustrated in FIG. 1B, the information (e.g. audio PCM signals) recorded in data frame '0' are preceded by eight multiplexed bits consisting of, for example, the 0th bit from each of the P-channel, Q-channel . . . W-channel. Preferably, the eight bits $d_1$–$d_8$ in data frame '0' exhibit a synchronizing pattern referred to as sync pattern $S_0$. The next-following data frame '1' consists of useful data (e.g. audio PCM signals) preceded by the first bit in each of the P-channel, Q-channel . . . W-channel. These multiplexed first bits $d_1$–$d_8$ exhibit another synchronizing pattern which is identified as sync pattern $S_1$. The CRC code for error detection is interposed in the last 16 frames among 98 frames, respectively.

Examples of the P-channel data and the Q-channel data are described below. These channels represent predetermined characteristics of the information with which they are recorded. For example, the P-channel data may be a flag to indicate the beginning and end of an audio program, as well as a pause in that program. In a specific embodiment, the P-channel signal may be a two-level signal having a relatively lower level throughout the duration of a music and a relatively higher level throughout the duration of a pause within or between such musics. In addition, the P-channel signal may appear as an alternating signal having a frequency on the order of about 2 Hz to define the lead-out section of the record disc. It will be appreciated that detection and count of this 2 Hz signal of this P-channel are indicative of the lead-out section of the disc so as to selectively play back the designated music.

The Q-channel data may be relatively more complicated than the above-mentioned P-channel data. Namely, the Q-channel data is used to enable more complicated control of the record disc playback device. For instance, by taking out the information data in Q-channel by a microcomputer which has been equipped in the disc playback device, it is possible to execute the random selecting operation of music programs since the Q-channel data may include timing information representing the duration as well as relative time of occurrence of the different portions of the audio program.

Thus, when the P-channel and Q-channel cue data of the aforementioned type are recorded on the disc, desired programs may be quickly and selectively accessed for playback by detecting and processing the cue data; and desired portions of such programs may be selected directly. In addition, it is possible to shift quickly from one program to another and, moreover, from one intermediate portion of a program to yet another portion of a still further program during the playback mode.

The remaining R through W channels are used to indicate other information of a music which has been recorded in the disc, such as the composer, author or performers of that music program, the text and the description of the music program, and the like.

Figure 2:
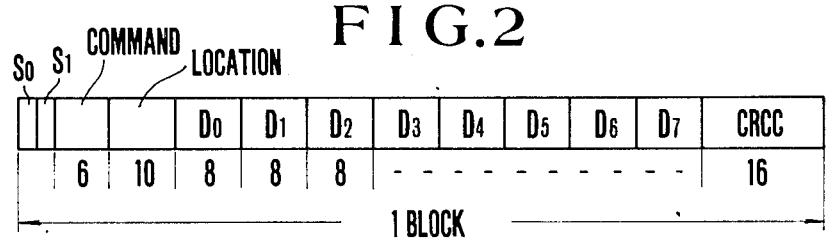
FIG. 2 is a schematic diagram for describing a data construction of one block in an embodiment of the invention.

An embodiment of the present invention will be described hereinbelow. FIG. 2 shows a data construction of one block of one channel, for example, R channel among R - W channels in this embodiment. This one block sequentially includes two bits of sync bits $S_0$ and $S_1$, a 6-bit command which is an instruction (microcode) to a microcomputer, a 10-bit location (display position data) for indicating a display position on a display screen, eight 8-bit display data $D_0$–$D_7$, and a 16-bit CRC code. This CRC code is a cyclic code to be used for error detection of the command, location and display data.

In this embodiment, the same data is recorded more than twice, e.g. four times with respect to the same location. This same data to be recorded four times is recorded successively or dispersed with a proper interval and then recorded.

Figure 3:
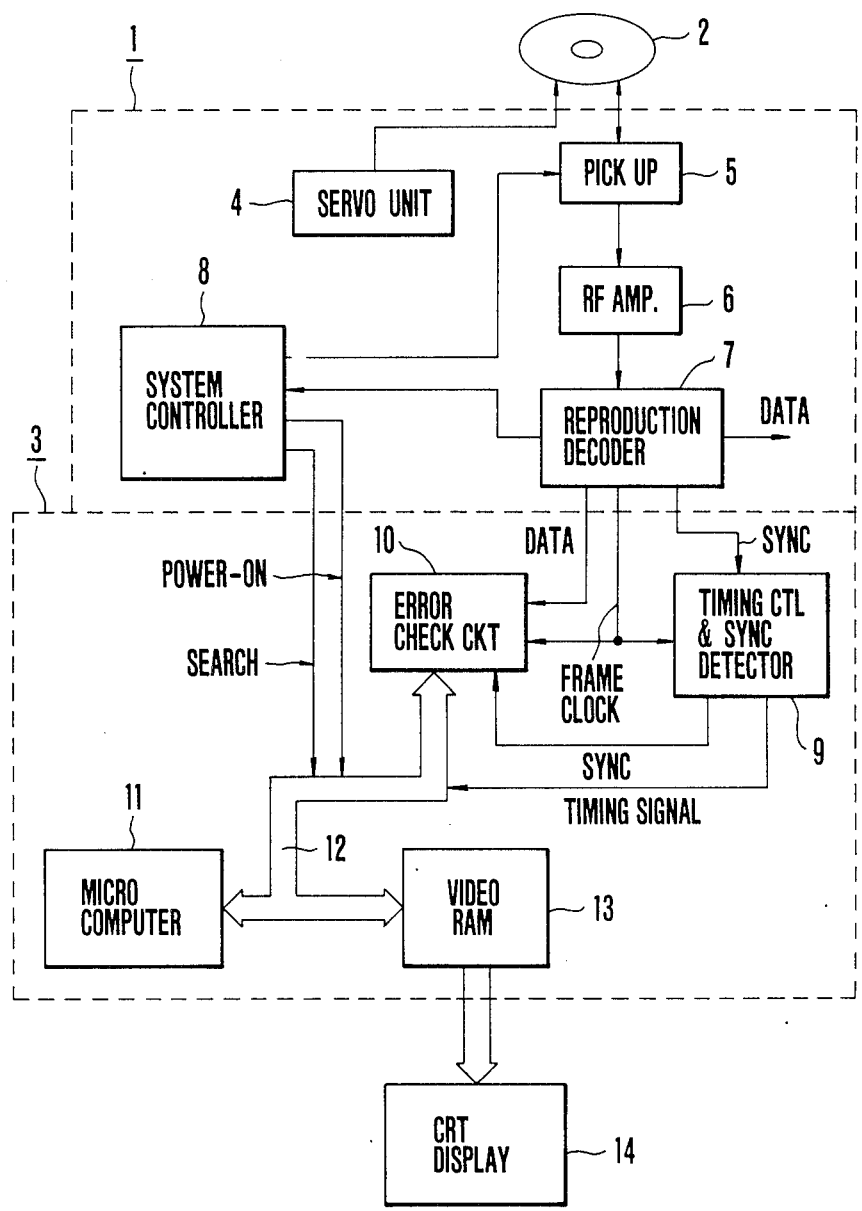
FIG. 3 is a block diagram illustrating the construction of an embodiment of the present invention.

Referring to a block diagram of FIG. 3, the construction of an embodiment of the digital audio disc system of the present invention will be described. In this drawing, reference numeral 1 indicates, within by an area surrounded by a broken line, a player section for a compact disc 2, and reference numeral 3 indicates, within an area surrounded by a broken line, a decoder & display section for a subcoding signal. The disc 2 is rotated at a constant linear velocity by a servo unit 4. A great number of pits corresponding to "1" and "0" of data are formed on the signal recording surface of the disc 2, and these information pits are optically read by a pickup device 5. An output of this pickup device is supplied to a reproduction decoder 7 through an RF amplifier 6, where they are demodulated and processed by the error correcting operation. This error correction is executed with respect to an audio PCM signal and a redundant code for error correction, and this PCM data after error correction is converted into an analog signal by a D/A converter (not shown).

A reference numeral 8 indicates a system control circuit of the player section 2, to which timing & control signals are supplied from the reproduction decoder 7. This system control circuit 8 generates a control signal to the pickup device 5. In the ordinary playback mode, the pickup device 5 moves in the radial direction from the inner track to the outer track on the information recorded surface of the disc 2 to read the recorded information from the spiral signal track formed on the disc 2 by scanning using the laser beam. In the search mode to search for a desired piece of recorded music or to randomly select the music, the pickup device 5 moves in the radial direction of the disc 2 at a higher speed than that in the ordinary playback mode. Such operations of the pickup device 5 are performed under control of the system control circuit 8.

The subcoding signal, frame clock, sync bits $S_0$ and $S_1$ of the subcoding signal which have been separated by the reproduction decoder 7 are supplied to the decoder & display section 3. For instance, it is assumed that the frequency of the frame clock is 7.35 kHz and the frequency of the sync bit is 75 Hz. These sync bits and frame clock are supplied to a timing control & sync detection circuit 9. A sync signal is derived which is generated when the 8-bit sync bits reproduced form the prescribed bit patterns $S_0$ and $S_1$, respectively, and a timing signal synchronized with the reproduction data is obtained. A subcoding signal is supplied to an error check circuit 10, then serial-parallel conversion and error check processings are performed by using the frame clock and the sync signal from the timing control & sync detection circuit 9. This error check is executed under control of a microcomputer 11. A timing signal from the timing control & sync detection circuit 9 is added to an address & data bus 12 between the error check circuit 10 and the microcomputer 11. The detection signals which respectively represent that the power has been turned on and that the system is in the search mode are also added to the address & data bus 12 from the system control circuit 8 of the disc player section 1.

A reference numeral 13 designates a video RAM, in which data corresponding to the picture element on the display screen of a CRT display 14 is memorized. The data read from this video RAM 13 is displayed on the CRT display 14.

Figure 4:
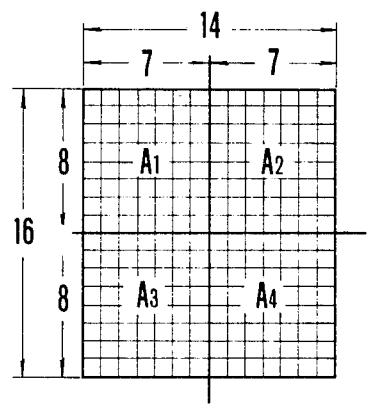
FIG. 4 is a schematic diagram for describing a display pattern in an embodiment of the invention.

FIG. 4 illustrates a construction of a display character of this embodiment. The display character is constructed by 14 (lateral elements)×16 (vertical elements)=224 (dots), and the reproduction time (transfer speed) per character from the disc 2 is set to 213 msec. However, the display information data is processed in each unit consisting of 7 (lateral)×8 (vertical)=56 (dots) as shown by reference characters $A_1$-$A_4$ of which the construction for one character has been divided into four units in consideration of the indication of simpler letters such as KATAKANAS. Therefore, the data is displayed on the CRT display 14 on the basis of these units. One display screen of the CRT display 14 is constructed by 40 (lateral)×24 (vertical)=960 (characters) using the units thus divided into four units as described above; therefore, the transfer speed of all characters in one display screen is (53.3 msec×960=51.2 sec).

Each of the afore-mentioned display data $D_0$-$D_7$ of the subcoding signal (refer to FIG. 2) is the data corresponding to eight lines in the respective areas of $A_1$-$A_4$.

There are 960 display positions in one display screen of the CRT display 14, these positions are designated by the locations. The display operation is started from the upper left portion to the upper right portion on the display screen of the CRT display 14, and names of a composer and a versifier or the like of a music which are reproduced from the disc 2 are displayed sequentially. The location indicative of this display start position is a particular 10-bit code, e.g. a code whose ten bits are all "0".

In this embodiment, a 6-bit command is used and 64 kinds of instructions are enabled. Ten examples among them are shown below:

0 0 0 0 0 0: Does not operate.
0 0 0 0 0 1: Clear the display screen.
0 0 0 1 1 1: Clear page 1.
0 0 1 0 0 0: Write the font into the address indicated by the location of page 1.
0 0 1 0 0 1: Display the content of page 2 in the CRT display 14 in place of the content of page 1.
0 0 1 1 1 1: Clear page 2.
0 1 0 0 0 0: Write the font into the address indicated by the location of page 2.
0 1 0 0 0 1: Display the content of page 1 in the CRT display 14 in place of the content of page 2.
0 1 1 0 0 0: Clear one line indicated by the location.

Figure 5:
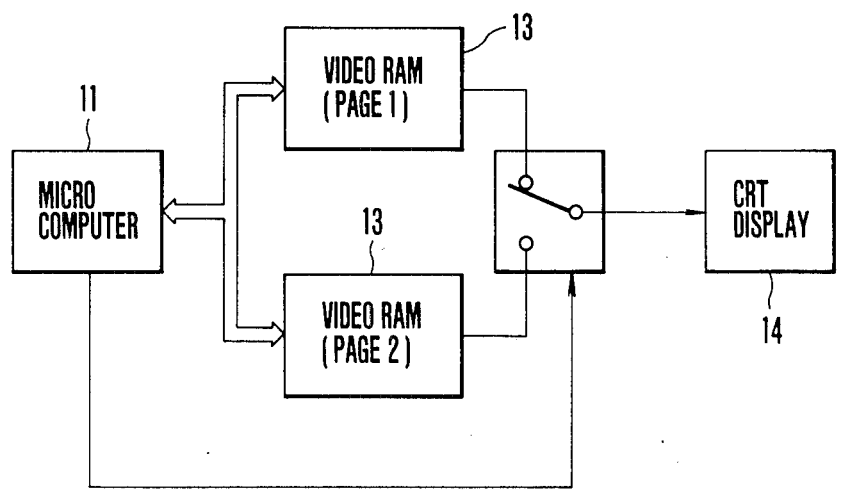
FIG. 5 is a schematic diagram for describing a part of an embodiment of the invention.

The above-mentioned pages 1 and 2 are the memory areas in the video RAM 13 as shown in FIG. 5, these pages are switched by a command from the microcomputer 11 on the basis of the afore-stated command.

Figure 6:
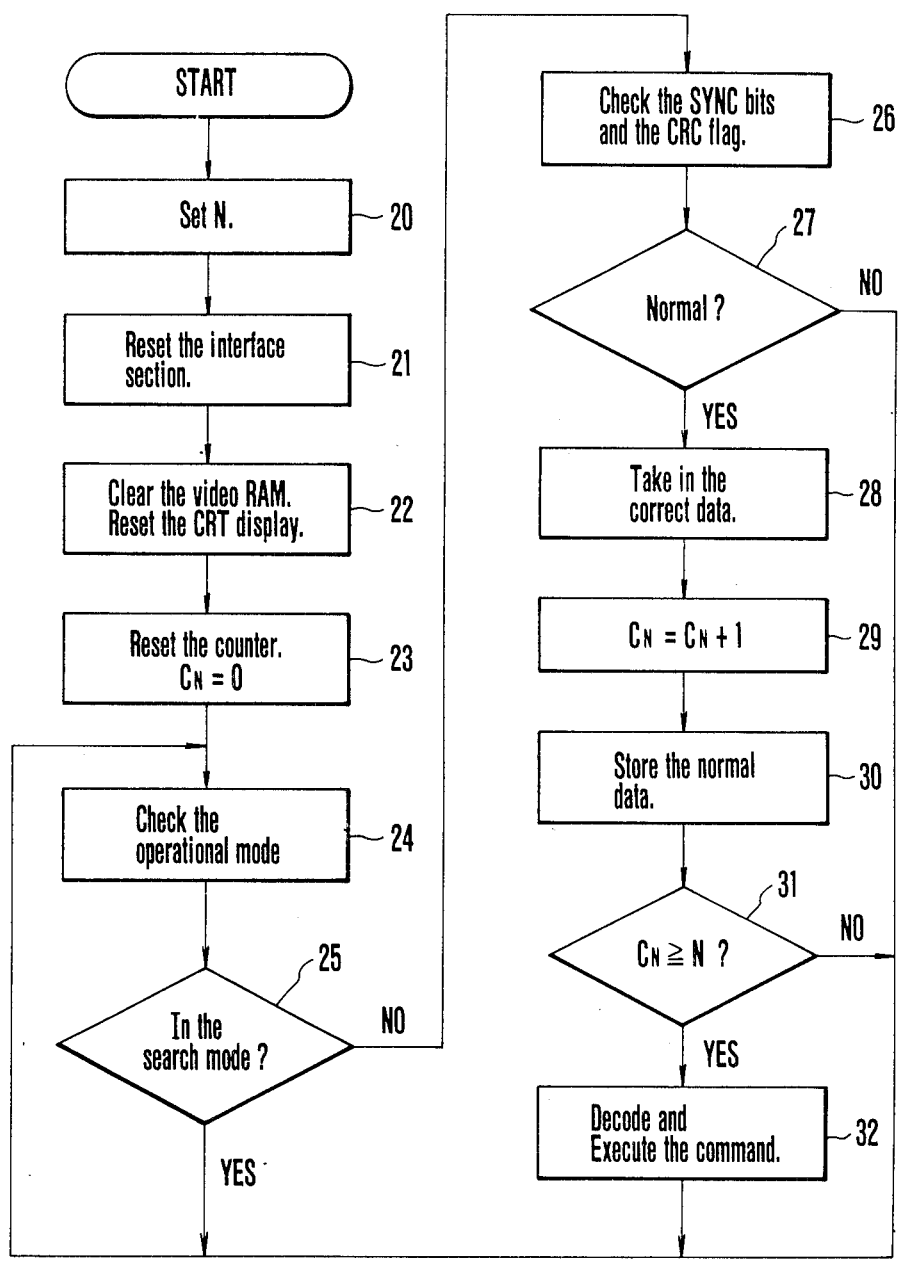
FIG. 6 is a flowchart for describing an error check operation of an embodiment of the invention.

The subcoding signal is checked by the error check circuit 10 whether it is an error or not. The microcomputer 11 controls this error check operation in accordance with the flowchart shown in FIG. 6. The error check operation will be described hereinafter with reference to FIG. 6.

First in step 20, the number N is set which is a reference number to determine that the data is correct when N subcoding signals coincide among the multi-recorded subcoding signals (in this embodiment, four times). Next, in step 21, the interface section with the disc player section 1 is reset, then the step advances to step 22, and the video RAM 13 is cleared and the CRT display 14 is reset.

To examine how many subcoding signals are identical among four, a counter for counting the number of coincidence is provided in the error check circuit 10.

This counter is reset, and the count value $C_N$ is set to "0" in step 23.

Next, the operational mode of the player section 1 is checked whether it is being searched or not in steps 24 and 25. While a detection signal which indicates that it is being searched is being supplied from the system control circuit 8, the error check is not done. The error check is executed in the ordinary playback mode. If "YES" in step 25, the processing is returned to step 24. If "NO", step 26 follows.

In steps 26 and 27, the subcoding signal is checked whether the sync bits could be taken out or not, and the CRC flag as a result of the CRC check is checked. Both sync bits $S_0$ and $S_1$ or either of them are checked. A sync signal corresponding to the sync bit/bits is checked whether it is supplied from the timing control & sync detection circuit 9 in the interval of a window pulse. This error check using the sync bit/bits and the CRC flag is performed in the manner as described below:

(1) When the sync bit/bits are normal and when the CRC flag of the data of that block is determined to be no error, the data is discriminated to be correct.
(2) Even when the sync bit/bits are normal, if error is detected in the CRC flag of the data of that block, the data is determined to be an error.
(3) Although no sync bit can be taken out, when no error is detected in the CRC flag of the data of that block, the data is determined to be correct.
(4) When no sync bit can be taken out, and when error is detected in the CRC flag of the data of that block, the data is determined to be an error.

If the check result is "NO" in step 27, the processing is returned to step 24, and if "YES", the step advances to step 28. As the result of the error check using the above-described sync bit/bits and the CRC flag, if the data is correct, that data is fetched in step 28, then the error check by using the multi-recording is executed. Next, the collating operation is performed on the basis of the data which has been determined to be no error by the CRC flag, and the counter is counted up one by one each time the data coincides in step 29. The data of which the CRC flag is correct is stored in the buffer memory in step 30. Then, the processing advances to step 31, where the count value $C_N$ of the counter is checked whether it is the predetermined number N or more. If "YES" in step 31, i.e. the condition ($C_N \geq N$) is satisfied, the reproduced subcoding signal is finally determined to be correct, then the command among them is decoded and executed in step 32. If "NO" in step 31, the processings is returned to step 24. After the processing of step 32 has been finished, the step is returned to step 24, and the same error check as described above is repeated again with respect to the subcoding signal in the next block.

While the player section 1 is performing the search operation, the display data is reproduced in fragments, so that abnormal display appears such that, for instance, a character which lacks a part thereof is displayed, or that different contents are concurrently displayed or the like. To avoid this, in this embodiment of the present invention, the correct data stored in the video RAM 13 before the system shifts to the search operation is held by the detection signal which indicates that it is being searched from the system control circuit 8. In this case, it may be possible to clear the display screen of the CRT display 14 during search operation, or to display the content which has been previously prepared.

Furthermore, although the pickup device 5 of the player section 1 does not start the playback operation from the head of each program when the power is turned on or when the operation is stopped in the search mode or the like, the reproduction is started from the intermediate portion of the program; consequently, the display data which lacks a part thereof is displayed on the CRT display 14. To prevent such a defect that the display is not done from the correct display start position, the detection signals which respectively indicate that the power has been turned on and that the system is in the search operation are supplied to the microcomputer 11 from the system control circuit 8. And until the display start position data is reproduced from the disc 2, such a processing is carried out that the reproduced data is not used as the data to be displayed. It can be identified by the location whether the reproduced data is the data of the display start position or not. In this case, it may be possible to use the special command which designates that the data is the first data of one display screen and to interpret this by the microcomputer 11.

In this embodiment, the display data is displayed by an array of a number of picture elements on the display screen of the CRT display; however, it may be possible use other display device such as a display in which a number of display segments consisting of light emission diodes or liquid crystals have been arranged horizontally.

In the above embodiment, the present invention has been applied to a digital audio disc (DAD); however, the present invention can be applied to other information recording systems such as an AHD (Audio High-Density Disc), a CED (Capacitance Electronic Disc), a VHD (Video High-Density Disc), a magnetic recording disc, or the like.

As understood from the above description of the embodiment, according to the present invention, since subcoding signals are recorded on the disc many times, it is possible to easily perform the error check of the display data simply in the reproduction side and to prevent that abnormal display data is indicated. In addition, since the command and the display position data for a microcomputer together with the display data have been also recorded in the disc, there is an advantage in which the hardware for display control can be simplified by equipping the microcomputer in the reproduction side.

Moreover, in accordance with the present invention, subcoding signals for display are recorded in the compact disc, so it is possible to perform the related display along with the playback of the music. In this case, it is also possible to prevent the indication of abnormal display such that the display character lacks a part thereof when the search operation is being performed for accessing the beginning of the music when the music programs are selected at random.

Furthermore, as understood from the explanation of the embodiment of the invention, it is appreciated that according to the invention, it is possible to prevent the indication of abnormal display such that a part thereof is not displayed when the disc playback is not started from the display start position at the time of power-on or the like.

Although a preferred embodiment of the invention is specifically illustrated and described herein, it will be appreciated that many modifications and variations of the present invention are possible in light of the above teachings and within the purview of the appended claims without departing from the spirit and intended scope of the invention.

What is claimed is:

1. In a digital audio disc system having a main channel for processing main program data consisting of audio signals and codes for error correction thereof, and a subchannel for processing additional data including display data corresponding to said main program data, said additional data being redundantly recorded on an audio disc so that the same additional data occurs at least twice at corresponding locations on the disc: Apparatus for controlling a display corresponding to said display data included in said additional data to appear only when said additional data is valid, comprising the combination of reproducing means for reproducing said main program data and said additional data from said disc;

error check means for collating the redundantly recorded additional data as reproduced and for generating a control signal indicative of the validity of said collated reproduced additional data in response thereto;

display means; and display control means for controlling said display means in response to said control signal to present said display corresponding to said display data included in said reproduced additional data only when said control signal indicates that said reproduced additional data is valid.

2. A digital audio disc system according to claim 1; wherein said additional data further includes a sync signal having a prescribed bit pattern, and said error check means is responsive to the reproduced sync signal to provide said control signal in response thereto.

3. A digital audio disc system according to claim 1; further including system control means for selectively operating said reproducing means in a playback mode and a search mode and for producing a mode signal indicating which mode has been selected; and in which said display control means is also responsive to said mode signal to cause said display means to present said display only when said mode signal indicates that said playback mode is selected.

4. A digital audio disc system according to claim 1; wherein said additional data further includes command data, and said error check means produces said control signal in response to said command data.

5. A digital audio disc system according to claim 1; wherein said display control means is a microprocessor.

6. A digital audio disc system according to claim 1; wherein said main program data and said additional data are recorded on said disc starting from respective start positions and continuing through following positions; and said reproducing means is actuable to begin reproduction at any of said positions;

said system further comprising means for detecting at which of said positions reproduction is begun and for producing a corresponding position indicating signal; and said displsy control means is also responsive to said position indicating signal to cause said display means to display said display only when said position indicating signal indicates that reproduction is at a start position.

7. A digital audio disc system according to claim 1; wherein said audio signals are audio PCM signals.

8. A digital audio disc system according to claim 1; wherein said reproducing means supplies the reproductions of said same additional data redundantly recorded to said error check means as successive data signals, and said error check means determines the validity or invalidity of each of said successive data signals and generates said control signal indicating said additional data is valid only when a predetermined plurality of said successive data signals are valid.

9. A digital audio disc system according to claim 1; wherein said corresponding additional data are recorded four times at said corresponding locations on said disc.

10. A digital audio disc system according to claim 1; wherein said main program data and said additional data are recorded on said disc starting from respective start positions and continuing through following positions, and said reproducing means is actuable to begin reproduction at any of said positions; and further wherein said display control means prevents display of reproduced display data until the latter is reproduced from one of said starting positions of the additional data.

11. A digital audio disc system according to claim 1; wherein said reproducing means is movable across said disc in a search mode at a speed higher than that at which said reproducing means moves across the disc in a normal playback mode, and said display control means inhibits display by said display means of display data reproduced while said reproducing means is movable at said higher speed in said search mode.

12. A digital audio disc system according to claim 11; wherein said display control means inhibits said display of display data by clearing said display means so long as said reproducing means is moving at said higher speed.

13. A digital audio disc system according to claim 11; wherein said display control means is operative, when said reproducing means is moving at said higher speed in said search mode, to cause said display means to display reproduced display data previously derived in the normal playback mode.

* * * * *